(12) United States Patent
Shimomura et al.

(10) Patent No.: US 7,531,211 B2
(45) Date of Patent: May 12, 2009

(54) PROCESS FOR PRODUCTION OF SUBMICROHONEYCOMB STRUCTURES

(75) Inventors: Masatsugu Shimomura, Hokkaido (JP); Hiroshi Yabu, Hokkaido (JP)

(73) Assignee: National University Corporation Hokkaido University, Hokkaido (JP)

( * ) Notice: Subject to any disclaimer, the term of this patent is extended or adjusted under 35 U.S.C. 154(b) by 193 days.

(21) Appl. No.: 11/661,620

(22) Filed: May 3, 2007

(65) Prior Publication Data

US 2008/0032048 A1 Feb. 7, 2008

Related U.S. Application Data

(63) Continuation of application No. PCT/JP2005/015456, filed on Aug. 25, 2005.

(30) Foreign Application Priority Data

Aug. 27, 2004 (JP) ............................. 2004-247852

(51) Int. Cl.
*B05D 3/04* (2006.01)
(52) U.S. Cl. ........................ 427/243; 427/244; 427/245; 427/247; 427/377; 427/378
(58) Field of Classification Search ........................ None
See application file for complete search history.

(56) References Cited

U.S. PATENT DOCUMENTS 5,387,378 A * 2/1995 Pintauro et al. ............... 264/48

FOREIGN PATENT DOCUMENTS

| JP | 2001-157574 | 6/2001 |
| JP | 2003-294905 | 10/2003 |
| JP | 2005-232238 | 9/2005 |

OTHER PUBLICATIONS

Abstracts and partial machine translation of JP2002-347107, Dec. 2002.*
Abstracts and partial machine translation of JP08-311231, Nov. 1996.*

* cited by examiner

*Primary Examiner*—Erma Cameron
(74) *Attorney, Agent, or Firm*—Peter F. Corless; Christine C. O'Day; Edwards Angell Palmer & Dodge LLP

(57) ABSTRACT

A process for the production of a honeycomb-like porous body of 10 to 1000 nm in thickness which is made of a water-insoluble polymer and has pores having diameters of 10 to 100 nm, which comprises the following steps: (1) the step of dissolving a water-insoluble polymer in a water-incompatible organic solvent having a surface tension ($\gamma L$) of 50 dyne/cm or below to prepare a solution of the polymer in the organic solvent, (2) the step of applying the solution prepared in the step (1) to the surface of a substrate with the proviso that the surface tension ($\gamma S$) of the substrate, the surface tension ($\gamma L$) of the organic solvent, and the surface tension ($\gamma SL$) between the substrate and the solvent satisfy the relationship: $\gamma S - \gamma SL > \gamma L$, and (3) the step of bringing the solution applied on the substrate into contact with air having a relative humidity of 30% or above to evaporate the organic solvent at such a rate that the coating thickness at applying the solution to the surface of the substrate is reduced to one-fifth within one second.

5 Claims, 2 Drawing Sheets

PROCESS FOR PRODUCTION OF SUBMICROHONEYCOMB STRUCTURES

TECHNICAL FIELD

Thin films having fine periodic structures are useful materials in various fields. In the electronic materials field, miniaturization of a channel in the field-effect transistor is required, and actually a process for producing those of 100 nm or below has been in practical use (see, Gerdinge, et al., IEEE Spectrum, 1989, Vol. 89, page 43). In the optical materials field, diffraction gratings, photonic crystals, etc. have been attracting attentions as a next-generation optical function element (see, Noda et al., Nature, 2000, Vol. 407, page 608). In addition, since a periodical structure equal to or less than the wavelength of light is transparent in visible light region, an effect of preventing scattering of light, etc. can be expected. Further, recently, also in the regenerative medicine field, it has been reported that a fine structure on the surface influences cultured cells (see, Cheng, et al., Science, 1997, Vol. 276, page 1425).

BACKGROUND ART

Conventionally, as a technology to produce a submicron size of honeycomb-like structure, photolithography, soft-lithography (see, Whiteside, et al., Angew. Chem. Int. Ed., 1998, Vol. 37, pages 550-575), etc. have been known. Such a miniaturization process for production by finely cutting a material is called as a top-down type of process for production. Generally, the top-down type of process for production essentially requires high energy because it is performed based on scission of intermolecular bond. Therefore, there are a lot of problems to be solved for production of simple periodic structure in view of multi-step processes, high cost, diffraction limit, etc.

Contrary to this, an attempt to produce a fine periodic structure by accumulating a material from the molecular level has been made. For example, as a process for production of a fine structure in 10 nm scale, phase separation of block copolymer has been known (see, Albrecht, et al., Macromolecules, 2002, Vol. 35, pages 8106-8110). Also, Francois, et al. (see, Nature, 1994, Vol. 369, page 387) has reported preparation of a structure having a regular form made of polystyrene-polyparaphenylene (PS-PPP) block copolymer. A block copolymer, which is bound covalently to terminals of polymers having different compatibilities, can vary a cycle of the phase separation structure depending on compatibility and length of each segment. However, this process also requires complicated organic synthesis process, and kinds of the block copolymers which can be synthesized are limited.

Further, a process for production of a two-dimensional or a three-dimensional periodic structure by agglomerating colloidal fine particles in submicron size (see, Gu, et al., Langmuir, Vol. 17) and a process for production of a inversed opal structure by using this as a template (see, Kalso, et al., Langmuir, 1999, Vol. 15, pages 8276-8281) have been reported, but both processes have various problems in their processes such as preparation of fine particles having a single particle size and decomposition of the template after molding.

As a process based on a different principle from these processes, a process for easily producing a honeycomb-like porous body by using water droplets as a template has been reported (JP-A-8-311231). Specifically, this is a process in which water droplets are condensed on the surface of a solution of a polymer in a non-aqueous organic solvent, then a honeycomb-like porous body is prepared by using said water droplets as a template. In addition, JP-A-2001-157574 has disclosed a process for production of a honeycomb-like porous body by casting a solution of poly-L-lactic acid in chloroform on a glass substrate followed by gently evaporating the solvent. In this connection, the term of "honeycomb-like porous body" means a thin film structured body made of a polymer, in which minute pores or dimples oriented to the vertical direction to the film are provided like a honeycomb along the plane direction of the structured body. The honeycomb-like porous body of the present invention is the same.

Patent Literature 1: JP-A-8-311231
Patent Literature 2: JP-A-2001-157574
Non-Patent Literature 1: Gerdinge, et al., IEEE Spectrum, 1989, Vol. 89, page 43.
Non-Patent Literature 2: Noda et al., Nature, 2000, Vol. 407, page 608.
Non-Patent Literature 3: Cheng, et al., Science, 1997, Vol. 276, page 1425.
Non-Patent Literature 4: Whiteside, et al., Angew. Chem. Int. Ed., 1998, Vol. 37, pages 550-575.
Non-Patent Literature 5: Albrecht, et al., Macromolecules, 2002, Vol. 35, pages 8106-8110
Non-Patent Literature 6: Francois, et al., Nature, 1994, Vol. 369, page 387.
Non-Patent Literature 7: Gu, et al., Langmuir, Vol. 17.
Non-Patent Literature 8: Kalso, et al., Langmuir, 1999, Vol. 15, pages 8276-8281.

DISCLOSURE OF THE INVENTION

Problem to be Solved by the Invention

However, it has been reported that a honeycomb-like porous body having pore diameters of 0.2 μm or below cannot be produced in this process using water droplets as a template. Thus, an object of the present invention is to provide a honeycomb-like porous body having a periodicity of 200 nm or below in the process using water droplets as a template, and a process for production of the same.

Means for Solving the Problem

In the process for production of a honeycomb-like porous body using water droplets as a template, the inventors of the present invention have found that the pore diameter of the porous body can be controlled on the level of 10-200 nm by controlling evaporation time of the solvent, specifically, by evaporating the solvent in less time, and accomplished the present invention as described below.

The process of the present invention is that a size of water droplets as a template is regulated and pore diameter is controlled to 200 nm or below, by controlling evaporation time of the solvent from a solution of a water-insoluble polymer in a water-incompatible organic solvent applied on a substrate, in the conventional method for producing a honeycomb-like porous body using water droplets as a template.

Specifically, the present invention relates to the following items a) to e).

a) A process for production of a honeycomb-like porous body of 10 to 1,000 nm in thickness, which is made of a water-insoluble polymer and has pores having a diameter of 10 to 200 nm, comprising the following steps:

1) a step of preparing a solution of a water-insoluble polymer in a water-incompatible organic solvent by dissolving a water-insoluble polymer in a water-incompatible organic solvent having a surface tension $\gamma L$ of 50 dyne/cm or below;

2) a step of applying the solution of a water-insoluble polymer in a water-incompatible organic solvent prepared in the step 1) on the surface of a substrate, with the proviso that the surface tension γS of the substrate, the surface tension γL of the water-incompatible organic solvent to be applied, and the surface tension γSL between the substrate and the solvent satisfy the relationship: γS−γSL>γL; and 3) a step of bringing the solution of a water-insoluble polymer in a water-incompatible organic solvent applied on the substrate in the step 2) into contact with air having a relative humidity of 30% or above to evaporate the water-incompatible organic solvent, with the proviso that an evaporating rate of the water-incompatible organic solvent is a rate that a liquid film thickness at applying the solution of a water-insoluble polymer in a water-incompatible organic solvent to the surface of the substrate is reduced to one-fifth within one second.

b) The process for production according to the item a), wherein the liquid film thickness of the solution of a water-insoluble polymer in a water-incompatible organic solvent applied to the substrate in the step 2) is 1 μm to 100 μm.

c) The process for production according to the item a), wherein the step 2) is carried out by applying the solution of a water-insoluble polymer in a water-incompatible organic solvent on the surface of the substrate while the substrate is transferred in uniaxial direction.

d) The process according to the item a), wherein the substrate is a glass plate or a metal plate.

e) The process for production according to the item a), wherein the step 3) is a step of bringing the solution of a water-insoluble polymer in a water-incompatible organic solvent applied on the surface of the substrate into contact with air stream having a relative humidity of 30% or above and a flow rate of 10 to 100 L/minute.

BEST MODE FOR CARRYING OUT THE INVENTION

Figure 1:
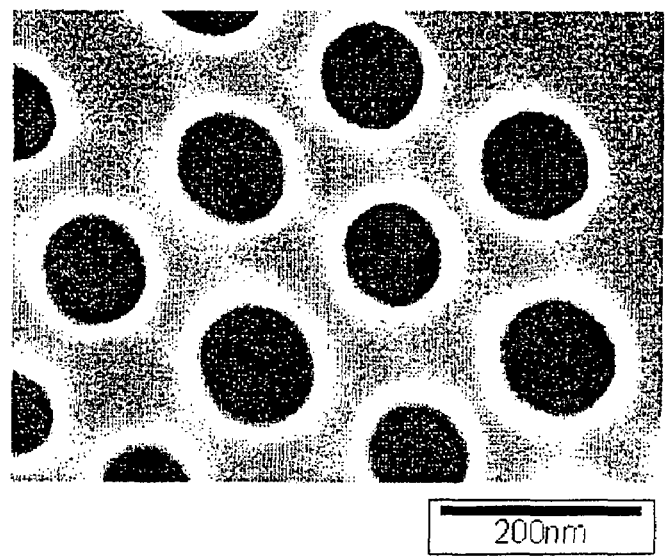
FIG. 1 is a magnified view of the honeycomb-like porous body of the present invention (pore diameter: 100 nm).

A preferred aspect of the present invention is to prepare a liquid film by applying a solution of a water-insoluble polymer in a water-incompatible organic solvent on the surface of a substrate made of glass or metal, bringing the liquid film into contact with air having a relative humidity of 30% or above and a flow rate within a range of 10 to 100 L/minute, thereby evaporating rapidly the water-incompatible organic solvent and controlling growth of water droplets to be 200 nm or below, to control the pore diameter of the honeycomb-like porous body to be 200 nm or below.

The step 1) constituting the process for production of the present invention is a step in which a solution of a water-insoluble polymer in a water-incompatible organic solvent is prepared by dissolving a water-insoluble polymer in a water-incompatible organic solvent having a surface tension γL of 50 dyne/cm or below.

As the water-incompatible organic solvent of the present invention, any organic solvent can be used, so long as the solvent has a surface tension of 50 dyne/cm or below, with such a level of water incompatibility that water droplets condensed on the surface of the solution can be maintained, and boiling point under the atmospheric pressure of 0 to 150° C., preferably 10 to 50° C. Specifically, the solvent includes halogenated hydrocarbons such as carbon tetrachloride, dichloromethane, chloroform, and the like; aromatic hydrocarbons such as benzene, toluene, xylene, and the like; esters such as ethyl acetate, butyl acetate, and the like; water-insoluble ketones such as methyl isobutyl ketone, and the like; and carbon disulfide and the like.

The solvent can be appropriately selected and used from these solvents by considering solubility of the water-insoluble polymer to be actually used.

In addition, when honeycomb-like porous body is produced by using fluorinated polymer such as polyacrylate or methacrylate having fluorinated alkyl group as a side chain where a hydrogen atom is substituted by a fluorine atom, use of a fluorine-based organic solvent (such as AK-225, and the like) gives favorable results.

The water-insoluble polymer to be used in the present invention is not particularly limited, so long as the polymer is insoluble in water and soluble in the above water-incompatible organic solvent or soluble in the water-incompatible organic solvent in the presence of a suitable surfactant, and a water-insoluble polymer, which can provide such function or characteristics as expected for the honeycomb-like porous body to be produced, can be appropriately selected and used.

The polymer includes, for example, biodegradable polymers such as polylactic acid and polyhydroxybutylic acid; aliphatic polycarbonate; amphiphatic polymer; optically functional polymer; electronic functional polymer, and the like.

As examples of specific combination of the above water-incompatible organic solvent and the water-insoluble polymer, for a polymer selected from the group consisting of polystyrene, polycarbonate, polysulfone, polyethersulfone, polyalkylsiloxane, polyalkyl methacrylate or polyalky acrylate such as polymethyl methacrylate, polybutadiene, polyisoprene, poly-N-vinylcarbazol, polylactic acid, poly-ϵ-caprolactone, polyalkylacrylamide, and copolymers thereof, an organic solvent such as carbon tetrachloride, dichloromethane, chloroform, benzene, toluene, xylene, carbon disulfide, and the like can be used in combination. In addition, for a polymer selected from the group consisting of acrylate or methacrylate having fluorinated alkyl group as a side chain and copolymers thereof, use of fluorocarbon solvents such as AK-225 (produced by Asahi Glass Co., Ltd.), trifluorobenzene, fluoroethers, and the like can also give favorable results.

In the present invention, the water-insoluble polymer, which is soluble in the water-incompatible organic solvent, is dissolved preferably in a concentration of 0.1 g/L to 10 g/L to the solvent. In this connection, the concentration of the water-insoluble polymer in the solution can be decided, as appropriate, corresponding to characteristics and physical properties required for the honeycomb-like porous body to be produced and the water-incompatible organic solvent to be used.

Another step constituting the present invention is a step of applying the solution of a water-insoluble polymer in a water-incompatible organic solvent prepared in the above step 1) on the surface of a substrate. In this connection, the surface tension γS of the surface of said substrate, the surface tension γL of the water-incompatible organic solvent to be applied, and the surface tension γSL between said substrate and said solvent satisfy the relationship: γS−γSL>γL. Here, "γS" represents the surface tension of the surface of the substrate, and "γSL" represents the surface tension between the substrate and said solvent.

In the case of the present invention, wettability of the substrate itself to which the solution of a water-insoluble polymer in a water-incompatible organic solvent is applied, to the water-incompatible organic solvent to be used, can influence on a thickness of liquid film formed on the substrate. Consequently, the substrate is preferably one having a high affinity to the solution of the water-insoluble polymer in the water-incompatible organic solvent to be applied thereon, and specifically, a substrate having a surface, which exhibits the surface tension represented by the above formula using the surface tension γL of the water-incompatible organic solvent as an index, may be used. Preferred examples of such substrate include glass plate, silicon-made plate, metal plate, or the like.

Further, a substrate, which has been finished on the surface thereof to improve an affinity to the water-incompatible organic solvent, can be used. To make such improvement in wettability of the surface of the substrate, known processes per se can be used, for example, silane coupling treatment or unimolecular film forming treatment process with a thiol compound for glass-made or metal-made substrate, respectively, in accordance with the substrate and the water-incompatible organic solvent to be used.

For example, when a hydrophobic solvent such as chloroform is used as the water-incompatible organic solvent, a substrate to be used is preferably a sufficiently washed Si substrate, a glass substrate modified with an alkylsilane coupling agent or the like on the surface thereof, and the like. Further, when a fluorine-based solvent is used, Teflon (Registered Trade Mark) substrate, or glass substrate modified with a fluorinated alkylsilane coupling agent or the like, and the like are preferably used.

In the present invention, a solution of the water-insoluble polymer in the water-incompatible organic solvent as exemplified above is applied on the substrate to form a liquid film of the solution. In this case, a desirable thickness of the liquid film is 1 μm to 100 μm, preferably 30 μm or below.

A process for applying a solution of the water-insoluble polymer in the water-incompatible organic solvent on the substrate includes, besides the process of dropping the solution on the substrate, barcoat method, dip coating method, spin coating method, and the like, and any type of batch type or continuous type can be used.

In the present invention, in view of producing a honeycomb-like porous body having fine pores, a process of applying a solution of the water-insoluble polymer in the water-incompatible organic solvent on a transferable substrate to prepare a liquid film is preferable. For example, such a process can be carried out by utilizing an apparatus having a structure generally shown in FIG. 3. The apparatus of FIG. 3 comprises substrate 1 transferable from the right side toward the left side on the drawing at a prescribed speed, metal plate 2 provided above substrate 1, and nozzle 3 to blow air having a prescribed relative humidity. In this connection, metal plate 2 is installed above substrate 1 with a gap corresponding to the desired thickness of liquid film.

On this apparatus, a thickness of the liquid film applied on substrate 1 can be adjusted to a thickness almost equivalent to the gap between substrate 1 and metal plate 2 by making substrate 1 applied with a solution of the water-insoluble polymer in the water-incompatible organic solvent pass under the metal plate. In addition, diameter of the pores to be formed in the honeycomb-like porous body can be also controlled by varying a thickness of the liquid film on the substrate with adjusting the gap between metal plate 2 and the substrate. Transfer speed of substrate 1 is desirably adjusted to 0.1 μm to 10 mm/second, particularly 1 to 5 mm/second.

By using this process, the honeycomb-like porous body to be formed on the substrate can be continuously recovered from the substrate, hence the process is advantageous as an industrial production process for the honeycomb-like porous body of the present invention.

Another step constituting the present invention is a step of bringing the solution of the water-insoluble polymer in the water-incompatible organic solvent applied on the substrate surface in the above step 2) into contact with air having a relative humidity of 30% or above to evaporate the water-incompatible organic solvent. In this connection, an evaporating rate of the solvent is a rate that the liquid film thickness at applying the solution of the water-insoluble polymer in the water-incompatible organic solvent to the surface of the substrate is reduced to one-fifth within one second.

By the conventional process in which a solution of the water-insoluble polymer in the water-incompatible organic solvent is left to stand in an environment of a high relative humidity to result in dew condensation on the surface of said solvent and evaporation of the organic solvent, the diameter of water droplets cannot be controlled to be 200 nm or below, and therefore, the honeycomb-like porous body having fine pores of 200 nm or less, in particular 10 to 100 nm cannot be produced.

In the present invention, by bringing the solution of the water-insoluble polymer in the water-incompatible organic solvent applied on the substrate into contact with air having a relative humidity of 30% or above to rapidly evaporate the water-incompatible organic solvent, and at the same time to inhibit growth of the water droplets condensed on the surface of the solution, pores of below 200 nm, preferably 10 to 100 nm are provided in the honeycomb-like porous body.

A method to practice this invention includes, a process in which a stream of air layer of 10 L/minute or above is formed roughly in parallel or upward to the plane direction of liquid film of a solution of the water-insoluble polymer in the water-incompatible organic solvent applied on the substrate to evaporate the water-incompatible organic solvent, a process in which a substrate applied with a solution of the water-insoluble polymer in the water-incompatible organic solvent is heated (for example, heated using a Berche element) at a temperature of below the boiling point of the water-incompatible organic solvent and below the dew point of the air in contact with the liquid film to evaporate the water-incompatible organic solvent, a process in which a solution of the water-insoluble polymer in the water-incompatible organic solvent applied on the substrate is placed under a reduced pressure not to exceed the boiling point of the water-incompatible organic solvent and the dew point of the air in contact with the liquid film to evaporate the water-incompatible organic solvent, or the like. Here, dew point means a temperature at which vapor contained in air kept at certain temperature reaches saturated state and starts to condense, and the temperature is a value fixed by a relative humidity and an absolute temperature.

A preferred example of the present invention is to generate an air stream having a relative humidity of 30% or above and a flow rate of 10 to 100 L/minute roughly in parallel or upward to the liquid film of a solution of the water-insoluble polymer in the water-incompatible organic solvent applied on the substrate. Flow rate of the air stream may be appropriately adjusted depending on volatility of the water-incompatible organic solvent to be used and thickness of the liquid film of a solution of the water-insoluble polymer in the water-incompatible organic solvent applied on the substrate, but it is generally 10 to 100 L/minute, preferably 10 to 50 L/minute. In addition, if direction of the air stream is designed in such way that the air stream run from obliquely upward or from vertical direction to the liquid film of a solution of the water-insoluble polymer in the water-incompatible organic solvent applied on the substrate, distortion or crack can be generated in the liquid film by a wind pressure by the air stream. In such a case, preferably the air stream is generated in parallel or upward to the liquid film of a solution of the water-insoluble polymer in the water-incompatible organic solvent applied on the substrate. In this case, the air stream may be generated by either a positive pressure from upstream or a negative pressure from downstream. For example, either ejection of prescribed air from a nozzle installed toward the substrate or suction of the air above the substrate from one side can be accepted.

Hereinafter, the present invention will be specifically explained by referring to Examples. However, these Examples should not be understood to be limiting the present invention in any way.

EXAMPLE 1

A solution of AK-225 of a compound represented by the following formula 1 (JP-A-2000-143726) which is a fluorinated resin compound, was prepared in a concentration of 1.0 g/L. This solution (30 μL) was dropped on a glass substrate, and placed in parallel to an air stream (flow rate: 10 L/min.) having a relative humidity of 40%.

Figure 2:
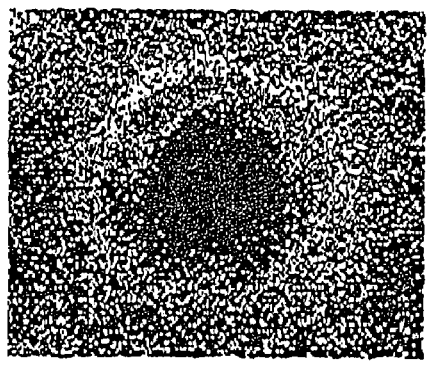
FIG. 2 is a magnified view of a part of the honeycomb-like porous body of the present invention (pore diameter: 20 nm).

The solvent evaporated instantly (within 1 second) to give a thin film, which was transparent by visual observation from the vertical direction. The structure formed in the prepared thin film was observed by a scanning electron microscope. As a result, it was found that a honeycomb structure having pore diameters of 100 nm or below has been formed (FIG. 1). Further, in the edge part, pores having diameters of around 20 nm at minimum were also observed (FIG. 2).

[Chemical Formula 1]

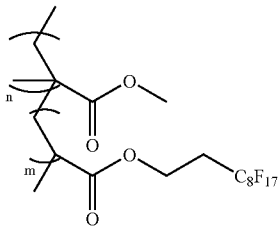

EXAMPLE 2

Figure 3:
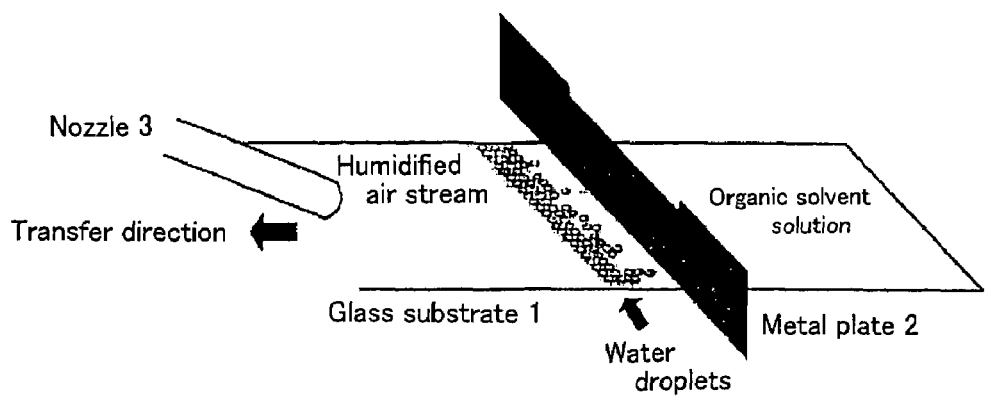
FIG. 3 illustrates an apparatus to produce continuously the honeycomb-like porous body of the present invention.

In order to produce continuously a thin film of honeycomb-like porous body with fine pores having pore diameters of 100 nm or below, an apparatus shown in FIG. 3 was assembled. In the apparatus of FIG. 3, as substrate 1, a glass substrate which was fluorine-coated by treating with a fluorinated alkylsilane coupling agent, 1H,1H,2H,2H-perfluorooctyl-trichlorosilane (produced by AZmax Co., Ltd.), followed by washing, was used. Further, metal plate 2 was installed above substrate 1 with a gap of 50 μm.

Figure 4:
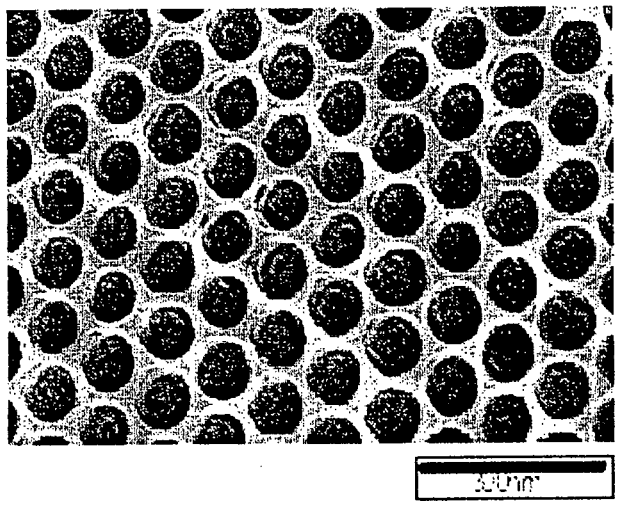
FIG. 4 is a magnified view of the honeycomb-like porous body of the present invention.

Substrate 1 applied with the organic solvent solution same as in Example 1 was transferred at a speed of 2 mm/second from the right side toward the left side on the Figure. After adjusting a thickness of the thin film on the substrate to 50 μm, air (flow rate: 10 L/min.) having a relative humidity of 40% was fed from nozzle 3. By this process, a honeycomb-like porous body having pore diameters of 100 nm or below was continuously produced (FIG. 4).

Figure 5:
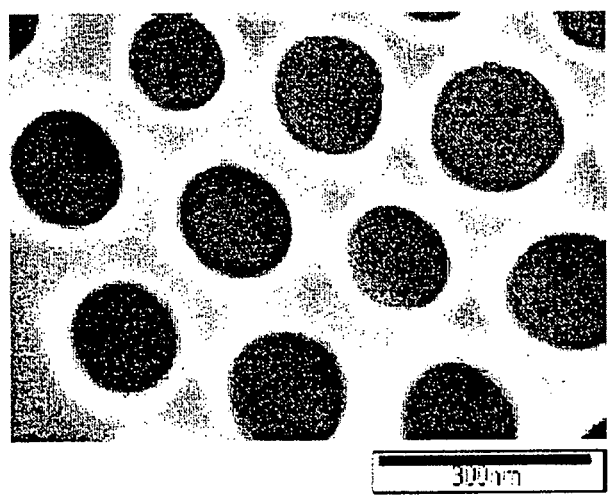
FIG. 5 is a magnified view of the honeycomb-like porous body of the present invention (pore diameter: 150 nm).
Figure 6:
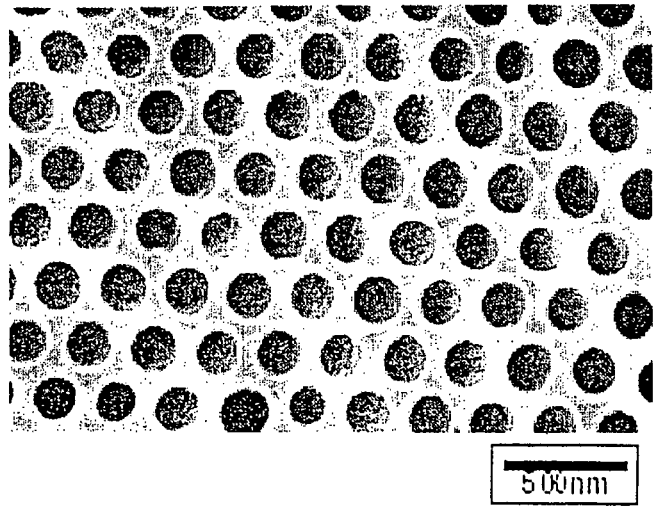
FIG. 6 is a magnified view of the honeycomb-like porous body of the present invention (pore diameter: 200 nm).

Further, in the above process, by adjusting position of metal plate 2 to set a thickness of the liquid film at 75 μm or 100 μm, a honeycomb-like porous body having a pore diameter of 150 nm (FIG. 5) or 200 nm (FIG. 6), respectively, was obtained.

What is claimed is:

1. A process for production of a honeycomb porous body of 10 to 1,000 nm in thickness, which is made of a water-insoluble polymer and has pores having diameters of 10 to 200 nm, comprising the following steps:
   1) a step of preparing a solution of a water-insoluble polymer in a water-incompatible organic solvent by dissolving a water-insoluble polymer in a water-incompatible organic solvent having a surface tension γL of 50 dyne/cm or below;
   2) a step of applying the solution of a water-insoluble polymer in a water-incompatible organic solvent prepared in the step 1) on the surface of a substrate, with the proviso that the surface tension γS of the substrate, the surface tension γL of the water-incompatible organic solvent to be applied, and the surface tension γSL between the substrate and the solvent satisfy the relationship: γS−γSL>γL; and
   3) a step of bringing the solution of a water-insoluble polymer in a water-incompatible organic solvent applied on the substrate in the step 2) into contact with air having a relative humidity of 30% or above to evaporate the water-incompatible organic solvent, with the proviso that an evaporating rate of the water-incompatible organic solvent is a rate that a liquid film thickness at applying the solution of a water-insoluble polymer in a water-incompatible organic solvent to the surface of the substrate is reduced to one-fifth within one second.

2. The process for production according to claim 1, wherein a liquid film thickness of the solution of a water-insoluble polymer in a water-incompatible organic solvent applied to the substrate in the step 2) is 1 μm to 100 μm.

3. The process for production according to claim 1, wherein the step 2) is carried out by applying the solution of a water-insoluble polymer in a water-incompatible organic solvent on the surface of the substrate while the substrate is transferred in uniaxial direction.

4. The process according to claim 1, wherein the substrate is a glass plate or a metal plate.

5. The process for production according to claim 1, wherein the step 3) is a step of bringing the solution of a water-insoluble polymer in a water-incompatible organic solvent applied on the surface of the substrate into contact with air stream having a relative humidity of 30% or above and a flow rate of 10 to 100 L/minute.

* * * * *